(12) United States Patent
Kelly

(10) Patent No.: US 10,436,001 B2
(45) Date of Patent: Oct. 8, 2019

(54) PROCESS FOR CONTINUOUSLY SUPPLYING A FRACTURING FLUID

(71) Applicant: Richard Kelly, East Amherst, NY (US)

(72) Inventor: Richard Kelly, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 14/293,403

(22) Filed: Jun. 2, 2014

(65) Prior Publication Data

US 2015/0345269 A1 Dec. 3, 2015

(51) Int. Cl.
*E21B 43/16* (2006.01)
*E21B 21/06* (2006.01)

(52) U.S. Cl.
CPC .......... *E21B 43/164* (2013.01); *E21B 21/062* (2013.01); *Y02P 90/70* (2015.11)

(58) Field of Classification Search
CPC ...... E21B 43/267; E21B 43/26; E21B 43/164; E21B 43/168; E21B 43/162; E21B 43/166; E21B 43/24; E21B 43/295; E21B 43/29; C09K 8/592; C09K 8/594; C09K 8/588; C09K 8/68; C09K 8/608
See application file for complete search history.

(56) References Cited

U.S. PATENT DOCUMENTS

| 4,374,545 | A | 2/1983 | Bullen et al. |
| 4,448,709 | A | 5/1984 | Bullen |
| 4,627,495 | A | 12/1986 | Harris et al. |
| 4,701,270 | A | 10/1987 | Bullen et al. |
| 5,515,920 | A | 5/1996 | Luk et al. |
| 5,558,160 | A | 9/1996 | Tudor |
| 5,899,272 | A | 5/1999 | Loree |
| 6,955,704 | B1 | 10/2005 | Strahan |
| 7,018,451 | B1 | 3/2006 | Torkildsen et al. |
| 7,213,651 | B2 | 5/2007 | Brannon et al. |
| 7,252,700 | B1 | 8/2007 | Strahan |
| 7,581,590 | B2 | 9/2009 | Lesko et al. |
| 7,620,481 | B2 | 11/2009 | Dykstra |
| 7,673,685 | B2 | 3/2010 | Huntley Shaw et al. |
| 7,677,309 | B2 | 3/2010 | Shaw et al. |
| 7,726,404 | B2 | 6/2010 | Kubala et al. |
| 7,735,551 | B2 | 6/2010 | Vozniak et al. |
| 8,025,099 | B2 | 9/2011 | Mesher |
| 8,066,068 | B2 | 11/2011 | Lesko et al. |
| 8,276,659 | B2 | 10/2012 | Fordyce et al. |

(Continued)

FOREIGN PATENT DOCUMENTS

| CA | 2220972 C | 3/1999 |
| CA | 2716446 A | 4/2012 |

(Continued)

OTHER PUBLICATIONS

Francis "Solvent Extraction with Liquid Carbon Dioxide" Industrial and Engineering Chemistry vol. 47, No. 2, pp. 230-233, Feb. 1955.*

*Primary Examiner* — William D Hutton, Jr.
*Assistant Examiner* — Charles R Nold
(74) *Attorney, Agent, or Firm* — Iurie A. Schwartz

(57) ABSTRACT

The present invention relates to a process of supplying a proppant-containing fracturing fluid to a wellhead, wherein the proppant-containing fracturing fluid can be continuously supplied during the fracture treatment.

12 Claims, 1 Drawing Sheet

Continuous Proppant Addition System

(56) References Cited

U.S. PATENT DOCUMENTS

| | | |
|---|---|---|
| 8,408,289 B2 * | 4/2013 | Loree .................... 166/90.1 |
| 8,490,700 B2 | 7/2013 | Lesko et al. |
| 8,636,065 B2 | 1/2014 | Lesko et al. |
| 8,689,876 B2 | 4/2014 | Loree et al. |
| 8,757,259 B2 | 6/2014 | Lesko et al. |
| 8,763,699 B2 | 7/2014 | Medvedev et al. |
| 2006/0289166 A1 | 12/2006 | Stromquist et al. |
| 2010/0155066 A1 | 6/2010 | Fordyce |
| 2011/0105370 A1 | 5/2011 | Mesher et al. |
| 2011/0284230 A1 | 11/2011 | Loree et al. |
| 2012/0318514 A1 | 12/2012 | Mesher |
| 2012/0325472 A1 | 12/2012 | Litvinet et al. |
| 2013/0168086 A1 | 7/2013 | Roberts |
| 2013/0186808 A1 | 7/2013 | Tomiyoshi et al. |
| 2013/0228330 A1 | 9/2013 | Loree et al. |
| 2013/0259575 A1 | 10/2013 | Hoier et al. |
| 2013/0299159 A1 | 11/2013 | O'Rourke et al. |
| 2013/0299167 A1 | 11/2013 | Fordyce et al. |
| 2014/0000720 A1 | 1/2014 | Mortzheim et al. |
| 2014/0000899 A1 * | 1/2014 | Nevison .................... 166/308.1 |
| 2014/0138085 A1 | 5/2014 | Lesko et al. |
| 2014/0151049 A1 | 6/2014 | Sanborn et al. |
| 2014/0151051 A1 | 6/2014 | Lissianski et al. |
| 2014/0262285 A1 | 9/2014 | Sethna et al. |
| 2014/0299321 A1 | 10/2014 | Burnette et al. |

FOREIGN PATENT DOCUMENTS

| | | | |
|---|---|---|---|
| GB | | 1439735 A | 6/1976 |
| WO | WO2010130037 | A1 | 11/2010 |
| WO | WO2011000089 | A1 | 1/2011 |
| WO | WO2012087388 | A1 | 6/2012 |

\* cited by examiner

PROCESS FOR CONTINUOUSLY SUPPLYING A FRACTURING FLUID

FIELD OF INVENTION

The present invention relates to a process for supplying a fracturing fluid to a wellhead, wherein the fracturing fluid is employed in the fracturing of a subterranean formation. More specifically, the invention relates to the continuous addition of proppant to a liquid stream, which in turn allows for the continuous supply of a proppant-containing fracturing fluid to the wellhead.

BACKGROUND OF THE INVENTION

The use of liquid carbon dioxide ($CO_2$) as a fracture fluid for stimulating oil and gas containing formations is well known in the art. In comparison to water, liquid $CO_2$ is non-damaging to the formations and flows back readily after fracture treatment. A critical aspect of any fracture treatment is the addition of proppant to the fracture fluid. This particulate matter props open the fractures allowing the oil or gas to flow into the wellbore in the production phase.

When liquid $CO_2$ is used as the fracture fluid, proppant must be added to the liquid $CO_2$ under pressure, since $CO_2$ does not exist as a liquid below its triple point pressure of approximately 60 psig. This is conveniently achieved in a batch blender system such as the one described in U.S. Pat. No. 4,374,545 to Bullen et al, and may be performed at pressures in the range 150 to 400 psig, for example. In such a system, proppant is filled into the batch blender followed by liquid $CO_2$. During fracture treatment, the now cooled proppant is metered out of the batch blender into a flowing liquid $CO_2$ fracture stream and the resultant proppant-laden liquid $CO_2$ stream is pumped to high pressure (e.g. 2,000 to 10,000 psig), prior to being injected into the wellbore. Limitations of this type of batch blender include the amount of proppant that can be loaded into the batch blender, approximately 20 tons in Bullen et al., and the relative difficulty in being able to change proppant as desired during the fracture treatment. For example, oftentimes it is preferred to use finer proppants to better fill the fracture tips and coarser proppants, having higher conductivity, to fill the body of the fracture.

The capacity limitation of these batch blenders can be alleviated by utilizing a number of blenders together, increasing the capacity of each blender, or by attempting to refill empty blenders during the fracture treatment. However, it will be appreciated that this requires significant additional capital and process complexity, and that the total proppant capacity may still be limited, especially when compared to larger fracture treatments (e.g., in excess of 500 tons of proppant per well), which is common.

The difficulty in being able to change proppants during a fracture treatment arises from the fact that only one type of proppant is usually preloaded into this type of batch blender and, therefore, more than one batch blender will be required if it is desired to utilize more than one type of proppant. The batch blender may be compartmentalized to accept multiple types of proppant, but this adds complexity and has limited job-to-job flexibility.

In conventional fracture treatments utilizing aqueous based fracture fluids, proppant, and other additives, are added to the base fracture fluid at atmospheric pressure in a continuous-style blender. This blender is herein termed continuous, as, within the limitations of on-site material supply and equipment reliability etc., it can continuously input feed streams and continuously output a product stream. These blenders typically also have a low hold-up, or inventory, of material in the blender which means that changes to the input streams are rapidly seen in the output stream. In this way it is possible to change the input proppant stream as necessary and thereby quickly change the type of proppant being utilized in the fracture treatment, and also to supply larger quantities of proppant to the fracture treatment by virtue of the continuous nature of these blenders.

By way of example, FIG. 1 illustrates a related art batch proppant system that also incorporates a polymer and a co-solvent. In this example, proppant is stored in batch blender vessel 130 together with liquid $CO_2$, and is metered from batch blender vessel 130 via conduit 131 into low pressure liquid $CO_2$ stream 111. Proppant-laden liquid $CO_2$ is then pumped to high pressure by fracture pump(s) 140, and passes to the wellhead via main conduit 141. In the case where friction reduction or viscosification of the liquid $CO_2$ is required for example, secondary liquid (co-solvent) and polymer are added via conduits 241 and 341, respectively, the secondary liquid being required to enable dissolution of the polymer into the liquid $CO_2$. The quantity of proppant added is limited by the capacity of vessel 130, and the proppant type may not readily be changed as desired during the treatment.

Further limitations of liquid $CO_2$ for use as a fracturing fluid include high pressure losses under high velocity conditions, and inherent low viscosity. Low pressure losses are desired in the wellbore, or tubing inserted therein, to enable higher fluid flow rates or minimize hydraulic horsepower requirements, while higher viscosity is desired to more effectively transport and place proppant in the fracture. Various types of high molecular weight polymers are commonly used in conventional aqueous-based fracturing fluids to achieve these two objectives. However liquid $CO_2$, on its own, is found to be a relatively poor solvent for high molecular weight polymers, even when raised to fracturing pressures (e.g., 2,000 to 10,000 psig). It is, therefore, required that a co-solvent is added to the liquid $CO_2$ at a sufficient concentration to facilitate dissolution of specific high molecular weight polymers, and thereby achieve friction reduction or viscosification.

Thus, to overcome the disadvantage in the related art, one of the objects of the present invention is to add proppant to a secondary liquid (co-solvent) at approximately atmospheric pressure whereupon it is added and/or mixed with the primary high pressure liquid $CO_2$ stream and polymer directly at the wellhead or at the very least downstream of the high pressure fracturing pumps.

It is another object of the invention to be able to provide the addition of proppant to the secondary liquid continuously, lending the ability to change the proppant type as desired during the fracture treatment, and to be able to continuously add proppant to the fracture fluid during the fracture treatment, or as desired.

It is a further object of the invention to be able to reduce frictional losses or viscosify the fracturing fluid through addition of a suitable polymer to the liquid $CO_2$ and secondary liquid (co-solvent) stream.

Other objects and aspects of the present invention will become apparent to one skilled in the art upon review of the specification, drawings and claims appended hereto.

SUMMARY OF THE INVENTION

In one aspect of the invention, a process of continuously supplying a proppant-containing fracturing fluid utilized in a fracturing operation is provided. The process includes: (a) supplying a first stream of liquid $CO_2$ from at least one storage tank, and pressurizing the first stream of liquid $CO_2$ through at least one first high pressure pump disposed in a main conduit; (b) continuously adding proppant to at least one liquid co-solvent to form a slurry and routing said slurry through at least one second high pressure pump disposed in a second conduit; (c) adding said slurry to the liquid $CO_2$ downstream of the first at least one first high pressure pump in step (a) into the main conduit; and (d) supplying the resultant proppant-containing fracturing fluid to the fracturing operation continuously.

In another aspect of the invention, a process of continuously supplying a proppant-containing fracturing fluid utilized in a fracturing operation is provided. The process includes (a) pressurizing a stream of liquid $CO_2$, and routing it through a first conduit; (b) continuously providing an additive slurry stream of proppant and at least one co-solvent; and (c) pressurizing the slurry stream of step (b) and adding it to the pressurized stream of liquid $CO_2$ thereby forming a proppant-containing fracture fluid which is continuously supplied to the wellhead.

In yet another aspect of the invention, a fracturing apparatus is provided. The apparatus includes: (a) at least one tank for storing and supplying a liquid $CO_2$ through a main conduit to a high pressure fracturing pump; and (b) a second conduit for supplying a slurry of proppant and at least one co-solvent through at least one second high pressure pump, wherein the slurry is injected into the main conduit downstream of the at least one first high pressure pump.

BRIEF DESCRIPTION OF THE DRAWINGS

The above and other aspects, features, and advantages of the present invention will be more apparent from the following drawings, wherein.

DETAILED DESCRIPTION OF THE INVENTION

The present invention addresses the aforementioned limitations of both the batch proppant blender and the liquid $CO_2$ fluid properties. Proppant is metered at approximately atmospheric pressure into a secondary liquid stream (co-solvent) which includes, for example, light hydrocarbons, oxy-hydrocarbons, siloxanes or mixtures thereof. The secondary liquid stream is substantially water-free, so as to minimize introduction of water into the formation, and is substantially miscible with liquid $CO_2$. This secondary liquid stream acts as a co-solvent for a friction reducing or viscosifying polymer. The proppant-laden secondary liquid (or slurry) is then pumped to high pressure and added to a high pressure liquid $CO_2$ stream, thereby adding proppant to a first stream of liquid $CO_2$ stream and creating a liquid $CO_2$ and secondary liquid solution.

Friction reducing or viscosifying polymer in flowable form, is pumped to high pressure and added to the combined liquid $CO_2$ and proppant-laden secondary liquid stream (slurry), whereupon the polymer dissolves by virtue of the presence of the secondary liquid which acts as a co-solvent for the polymer. In order to render the polymer flowable it is conveniently disposed in a solution or an emulsion.

According to the invention, proppant may be continuously added to the secondary liquid stream, and therefore the liquid $CO_2$ stream, during the fracturing process without batch limitation and may be changed during the treatment by switching to a different proppant source. Additionally, high friction losses in the wellbore or viscosification of the liquid $CO_2$ are addressed through addition of a suitable polymer.

Figure 1:
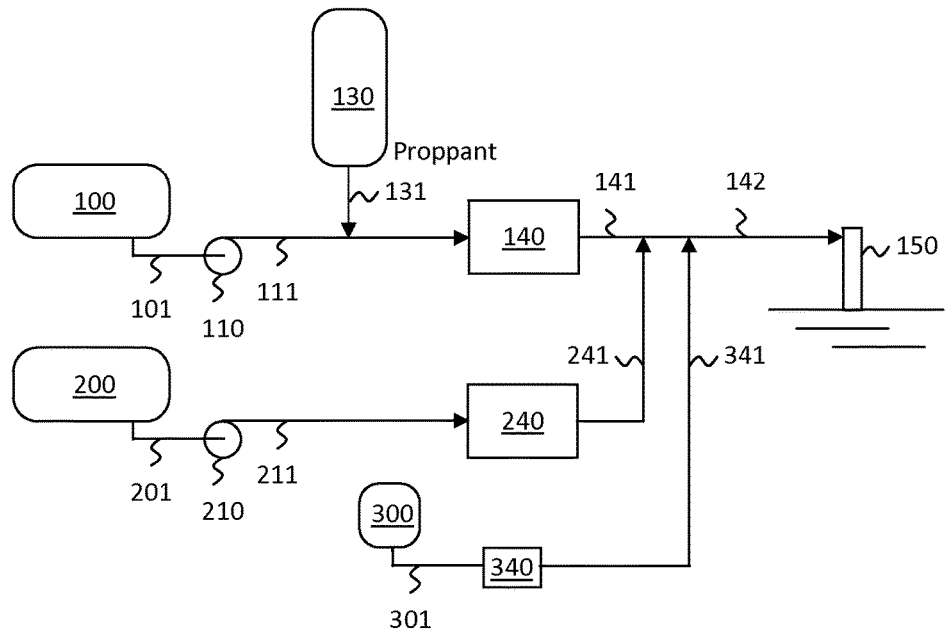
FIG. 1 is a schematic representation of a related art, batch proppant addition system.
Figure 2:
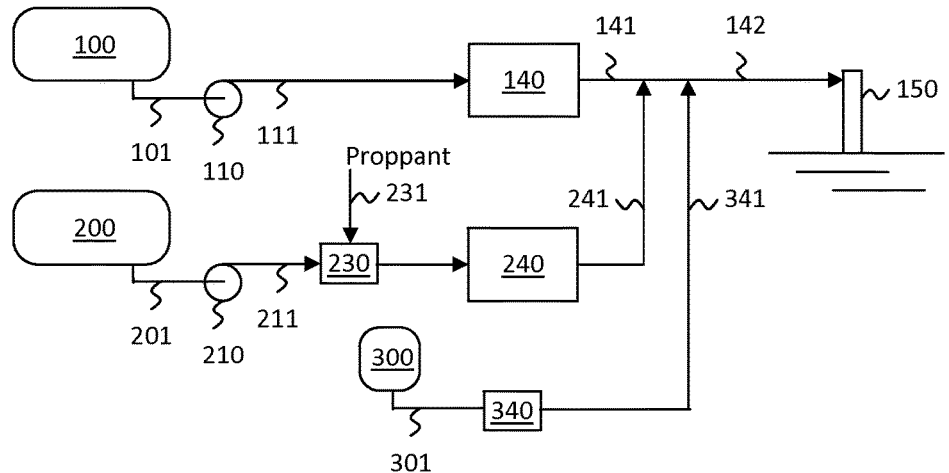
FIG. 2 is a schematic representation of a continuous proppant addition system and continuous supply of a proppant-containing fracturing fluid to the wellhead.

With reference to FIG. 2, an exemplary embodiment of the continuous process and system employed is described. In the present invention the term "continuous" is employed to define a process, or equipment that can continuously input, or accept input material and that can continuously output product material without reliance on a significant inventory of material contained in that equipment or within that process. For purposes of clarity, the term "continuous" is differentiated from the term "batch", where a process or equipment relies upon a significant inventory of material contained in that equipment or process to supply an output product, and is not continuously fed with input material that then transfers to the output product. As will be appreciated by those skilled in the art, continuous processes or equipment may change rates or compositions and can stop and start intentionally or unintentionally, however these modes of operation are still considered to be within the above definition of continuous.

The liquid $CO_2$ ($LCO_2$), can be stored as a bulk refrigerated liquid in insulated storage tank(s) 100, at a pressure in the approximate range 150 to 400 psig, and with a temperature at or below its boiling point. This is typically in the range −40 to 20° F. depending on pressure (i.e., sub-cooled to saturated). $LCO_2$ is fed to booster pump 110 via conduit 101, where its pressure is raised by about 50 psi or more prior to being fed to high pressure fracture pump(s) 140 via conduit 111.

Booster pump 110 ensures that the pressure of $LCO_2$ passing to high pressure fracture pump(s) is sufficiently above its vapor pressure to mitigate cavitation or vapor lock in high pressure fracture pump(s) 140. High pressure fracture pump(s) 140 raise the pressure of the $LCO_2$ to a value typically in the range 2,000 to 10,000 psig, depending on the needs of the particular fracture treatment. High pressure first $LCO_2$ stream is then fed to wellhead 150 via main conduit 141. In parallel, secondary liquid (co-solvent) is stored in liquid storage tank(s) 200, which may be kept at approximately atmospheric pressure and a temperature such as ambient or a temperature that precludes freezing, boiling or other undesired effects.

The secondary liquid (co-solvent) is preferably selected from one of the following:

1) A fatty acid monoalkyl ester. These materials include saturated and unsaturated esters of between about 8 and about 24 carbon units per chain which are typically obtained from triglycerides of plant or animal origin by means of transesterification with $C_1$-$C_4$ monohydric alcohols. Examples include mixed and pure fatty acid esters such as isopropyl myristate, isopropyl laurate, methyl oleate, and fatty acid methyl esters derived from the methanolysis of soy, corn, canola, coconut and palm oils, beef tallow, yellow grease, used cooking oils and the like, which are commonly sold as biodiesel fuel. Preferred materials of this class are liquid esters having an advantageously low melting point and high flash point such as methyl oleate and soybean oil biodiesel.

2) An alkylene glycol derivative. Suitable materials are derivatives of linear diols containing from one to about four ethylene oxide and/or propylene oxide units, that may be independently terminated by either a $C_1$-$C_6$ alkyl or aryl ether or a $C_2$ to $C_4$ carboxylic acid ester. Materials included in this category have the general structure below:

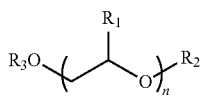

n=1 to 4
$R_1$=H or $CH_3$
$R_2+R_3$=H or $C_1$-$C_6$ Alkyl or Aryl or $C_2$-$C_4$ Acyl Examples of this class include unsubstituted glycols such as tetraethylene glycol; glycol monoethers such as propylene glycol phenyl ether (DOWANOL PPH); glycol diethers such as triethylene glycol dimethyl ether ("diglyme") and tetraethylene glycol dimethyl ether ("tetraglyme"); glycol monoalkyl ether esters such as diethylene glycol butyl ether acetate (EASTMAN DB ACETATE) and dipropylene glycol methyl ether acetate (DOWANOL DPMA); and glycol diesters such as propylene glycol diacetate (DOWANOL PGDA). Preferred materials of this class will have at least one terminal ether or ester substitution. Examples of preferred materials are tetraethylene glycol dimethyl ether and diethylene glycol monobutyl ether acetate.

3) A $C_8$-$C_{18}$ aliphatic alcohol or the ester of these with a $C_2$-$C_4$ carboxylic acid. Examples of materials of this class include 2-ethylhexanol, lauryl alcohol, hexadecanol and 2-ethylhexyl acetate.

Examples of preferred secondary liquids (co-solvents) include methyl oleate, soy methyl ester, diethylene glycol dimethyl ether, tetraethylene glycol dimethyl ether, diethylene glycol butyl ether acetate and dipropylene glycol methyl ether acetate or mixtures thereof, which have a closed cup flash point greater than 140° F. The low flammability associated with a high flash point is of significant advantage in the safe design and operation of this type of equipment. In particular, soy methyl ester is preferred because it has a closed cup flash point of approximately 320° F., depending on the source, and is relatively cheap. Various other fatty acid esters may be used as desired, or mixtures thereof. These may be sold as solvents under various tradenames or even as B100 biodiesel when originally intended for use a fuel ingredient.

Examples of other secondary liquids (co-solvents) that may be utilized include condensate, diluent, toluene, butane, pentane, hexane, heptane, naphtha, kerosene, acetone, tetrahydrofuran, silicone oils, linear, branched or cyclic forms of the aforementioned compounds and mixtures thereof. As will be appreciated, many of these have a lower cost, but also a lower flash point.

The secondary liquid is transferred from the storage tanks and proppant is added to the second liquid stream at approximately atmospheric pressure via conduit 231. Although not shown the proppant is metered from proppant storage silos by conventional means such as conveyors or augers. The proppant type can be readily changed by switching proppant source, and the proppant concentration can be readily changed by controlling the speed, or throughput, of the metering device.

A mixer vessel 230, which acts as a continuous proppant blender, may be used to effect satisfactory mixing of the proppant with the secondary liquid without entrainment of air, for example, and may be used as a convenient point to combine other additives, if desired. Mixer vessel 230 can be substituted with a conventional continuous proppant blender. The proppant-laden secondary liquid stream (or slurry) is pressurized by high pressure fracture pump(s) 240 and added to the high pressure first $LCO_2$ stream in main conduit 141 through conduit 241.

Separately, and in parallel, a flowable polymer is stored in vessel(s) 300. The polymer is chosen based on a number of considerations, as it can function a friction reducer or viscosifier or both, depending on factors including polymer type, molecular weight, degree of branching, and concentration, etc. The polymer must be at least partially soluble in the $LCO_2$ and co-solvent mixture and includes, for example, polysiloxanes, polyvinyl acetates, polyalphaolefins, and polyalkylene oxides.

The selected polymer is rendered flowable by dissolving in a suitable solvent such as hydrocarbons, oxy-hydrocarbons, or siloxanes. Alternatively, the polymer may be rendered flowable by disposition in an emulsion, for example, a water-borne emulsion, which may be stabilized by suitable surfactants for example. The flowable polymer, herein referred to as a "polymer mix", is routed through conduit 301, and the pressure is raised by high pressure pump(s) 340 disposed in said conduit. The polymer mix is then added to the combined $LCO_2$ and proppant-laden secondary liquid stream via conduit 341, into the main conduit 141 to form proppant-containing fracture fluid stream 142, whereupon the polymer dissolves in the liquid $CO_2$ and secondary liquid (co-solvent) solution. Proppant-containing fracture fluid stream 142 is then routed to the wellhead 150 and down the wellbore, or tubing inserted therein, or the annulus between the wellbore and inserted tubing, as part of the fracture treatment. Alternatively, all three streams can instead be routed to the well head where they are united and mix as they are sent down the wellbore, tubing or annulus.

In yet another exemplary embodiment, the polymer mix is added to the high pressure $LCO_2$ stream before the proppant-laden secondary liquid stream is added.

In yet another exemplary embodiment, the polymer mix is combined with proppant-laden secondary liquid stream prior to addition to the high pressure liquid $CO_2$ stream.

In yet another exemplary embodiment, the polymer is dissolved in the secondary liquid stream.

Although not shown, in FIG. 2, the pressurized proppant-laden secondary liquid stream 241, may pass through an intensifier which acts to concentrate the stream in proppant by removing a portion of the secondary liquid. The concentrated proppant stream is added to the liquid $CO_2$ stream as before and the portion of the removed secondary liquid stream can be reused. Use of an intensifier lends the ability to pressurize a more dilute proppant-laden secondary liquid stream through pump(s) 240, and the ability to increase the concentration of proppant in the final fracture fluid stream if desired.

As can be appreciated, pump(s) 240 have to process a proppant-laden stream and as such are subject to abrasive wear and will have limitations with respect to the proppant loading that it can process. It is therefore contemplated that proppants may be selected to reduce the amount of wear or to maximize their loading in the secondary fluid. More spherical, lightweight and coated proppants may for example be utilized in this respect. Additionally, a secondary liquid have good lubricity, such as soy methyl ester for instance, may be selected in order to minimize wear or improve proppant loading.

In another exemplary embodiment, the addition of more than one type of proppant to the secondary liquid stream as may be desired in the fracture treatment can be accomplished. For example, proppants having different particle size ranges, densities or coatings may be added to the second liquid stream at the same time.

As can be appreciated by those skilled in the art, there are times during a fracturing treatment when proppant is not required in the fracture fluid, such as in the initial pad stage, when a fracture is first formed, or in sweep stages, where may be attempted to sweep previously placed proppant further into the fracture. In these situations, proppant flow via conduit 231 is ceased. In the case that friction reduction or viscosification of the fracture fluid is still required, then the secondary liquid continues to be supplied via conduit 241, and the polymer mix continues to be supplied from via conduit 341. In the case that neither friction reduction nor viscosification is required, then the supply of polymer mix and, optionally the supply of secondary liquid, is ceased as well.

The present invention will be further described with respect to the following example, which is not to be construed as limiting the invention, but rather to further illustrate and exemplary laboratory devised embodiment.

Example

In the laboratory, liquid $CO_2$ was placed in a first syringe pump at ambient temperature and passed through a 6 foot long $\frac{1}{16}^{th}$ inch outside diameter coil, with 0.02 inch wall thickness, into a second syringe pump which controlled the downstream pressure to 3,000 psig. Soy methyl ester was placed in a third syringe pump at room temperature and added into the liquid $CO_2$ before the $\frac{1}{16}^{th}$ inch coil. A high molecular weight polydimethylsiloxane (PDMS) polymer having a kinematic viscosity>120,000,000 cSt was pre-dissolved in a liquid naphtha solvent at a concentration of 10 wt %, placed in a fourth syringe pump and added to the combined liquid $CO_2$ and soy methyl ester mixture before the $\frac{1}{16}^{th}$ inch coil. The flow rates from the first, third and fourth pumps were controlled to give a composition of 90 wt % liquid $CO_2$, 9 wt % soy methyl ester, 0.9 wt % naphtha and 0.1 wt % PDMS, and a total flow rate of 150 ml/min. A pressure drop of 641 psi was measured through the $\frac{1}{16}^{th}$ inch coil. Pure liquid $CO_2$ under the similar conditions yielded a pressure drop of 1013 psig, meaning that approximately 37% friction reduction was obtained with the experimental mixture compared to pure liquid $CO_2$. In this calculation, friction reduction is approximated as the percent reduction in pressure drop, rather than percent reduction in Fanning friction factor, since it neglects the relatively small changes in density due to varying composition and pressure.

In commercial operation, and according to the present invention, proppant may be added to the liquid soy methyl ester and thereby incorporated into the fracturing fluid. If silica sand were used as a proppant and added to the soy methyl ester at 50 volume % for instance, it can be shown that the concentration of proppant in the combined liquid $CO_2$, soy methyl ester, naphtha, PDMS fracturing fluid described above, would be approximately 8.7 volume % or 2.2 lbs of proppant per gallon of fracture fluid, which is an adequate upper limit for many fracture treatments. If higher proppant loadings are required, then higher flow rates and thereby higher proportion of the secondary fluid, may conveniently be used in the fracture fluid. If lower proppant loadings are required, then lower proppant concentrations in the secondary liquid may be conveniently employed.

Although various embodiments have been shown and described, the present disclosure is not so limited and will be understood to include all such modifications and variations as would be apparent to one skilled in the art.

I claim:
1. A process of continuously supplying a proppant-containing fracturing fluid utilized in a fracturing operation, comprising:
   (a) supplying a first stream of liquid $CO_2$ from at least one storage tank where said liquid $CO_2$ it is at a pressure in the approximate range of 150 to 400 psig and temperature of −40 to 20° F., and pressurizing the first stream of liquid $CO_2$ through at least one first high pressure pump disposed in a main conduit;
   (b) continuously adding proppant to at least one liquid co-solvent to form a slurry wherein the co-solvent is substantially miscible in liquid $CO_2$ forming a single phase and routing said slurry through at least one second high pressure pump disposed in a second conduit;
   (c) adding said slurry to the liquid $CO_2$ downstream of the first at least one first high pressure pump in step (a) into the main conduit thereby forming a proppant-containing single phase liquid;
   (d) routing friction reducing and/or viscosifying polymer mix through at least one third high pressure pump dispose in a third conduit and providing said polymer mix at a point downstream of step (c) in the main conduit, thereby forming a friction and/or viscosity modified proppant containing single phase liquid; and
   (e) supplying the modified proppant-containing liquid from step (d) to the fracturing operation continuously.

2. The process of claim 1, wherein the polymer in the polymer mix comprises polysiloxanes, polyvinyl acetates, polyalphaolefins, and polyalkylene oxides.

3. The process of claim 1, wherein the polymer is dissolved in a solvent which includes hydrocarbons, oxy-hydrocarbons, or siloxanes to form the polymer mix.

4. The process of claim 1, wherein the polymer mix is an emulsion.

5. The process of claim 4, wherein the polymer in an aqueous emulsion.

6. The process of claim 1, wherein the at least one liquid co-solvent is a hydrocarbon, an oxy-hydrocarbon, a siloxane or mixtures thereof.

7. The process of claim 6, wherein the at least one liquid co-solvent, is selected from one of the following categories:
   i: A $C_1$-$C_4$ monoalkyl ester of a $C_8$ to $C_{24}$ fatty carboxylic acid derived from a plant or animal triglyceride;
   ii: An alkylene glycol derivative of the general structure:

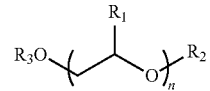

n=1 to 4
   $R_1$=H or $CH_3$
   $R_2$+$R_3$=H or $C_1$-$C_6$ Alkyl or Aryl or $C_2$-$C_4$ Acyl
   iii: A $C_8$-$C_{18}$ aliphatic alcohol or the ester of these with a $C_2$-$C_4$ carboxylic acid.

8. The process of claim 7, wherein the liquid co-solvent has a closed cup flashpoint greater than 140° F. and is selected from the group consisting of: methyl oleate, soy methyl ester, diethylene glycol dimethyl ether, tetraethylene glycol dimethyl ether, diethylene glycol butyl ether acetate and dipropylene glycol methyl ether acetate or mixtures thereof.

9. The process of claim 6, wherein the liquid co-solvent is selected from the group consisting of: toluene, butane, pentanes, hexanes, heptanes, naphthas, kerosene, acetone, tetrahydrofuran, silicone oils, linear, branched or cyclic forms of the aforementioned co-solvents.

10. The process of claim 1, wherein the slurry and the polymer mix are combined prior to addition to the liquid $CO_2$ stream.

11. The process of claim 1, wherein the polymer is dissolved in the at least one liquid co-solvent prior to making the slurry.

12. The process of claim 1, wherein the first stream of liquid $CO_2$ and the slurry and the polymer mix are combined directly at the wellhead.

\* \* \* \* \*